C. H. ANDRUS.
BALL BEARING.
APPLICATION FILED MAY 20, 1920.
1,363,705.  Patented Dec. 28, 1920.
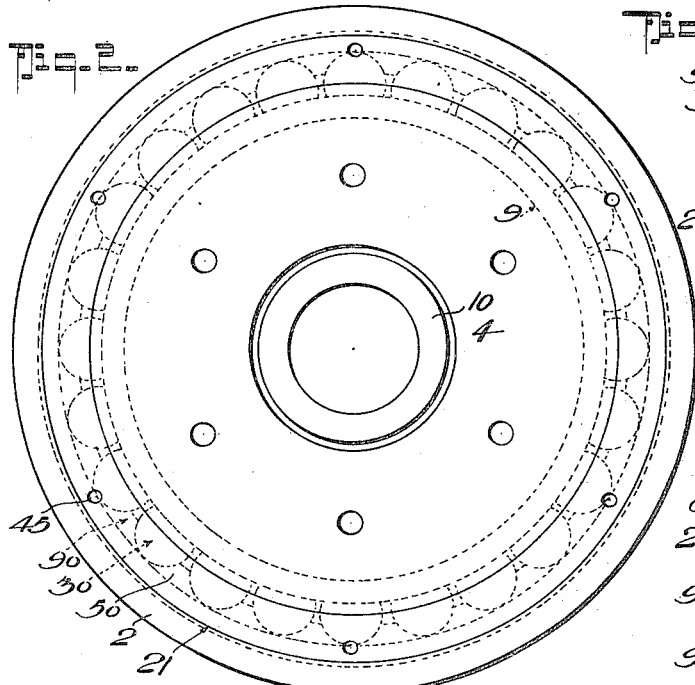
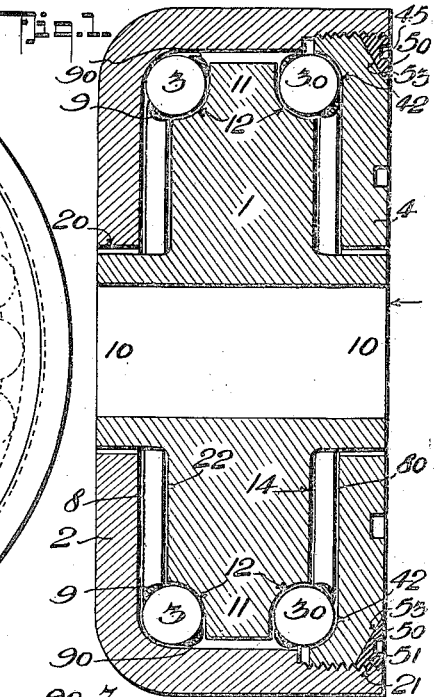
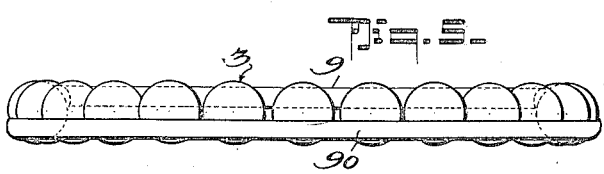
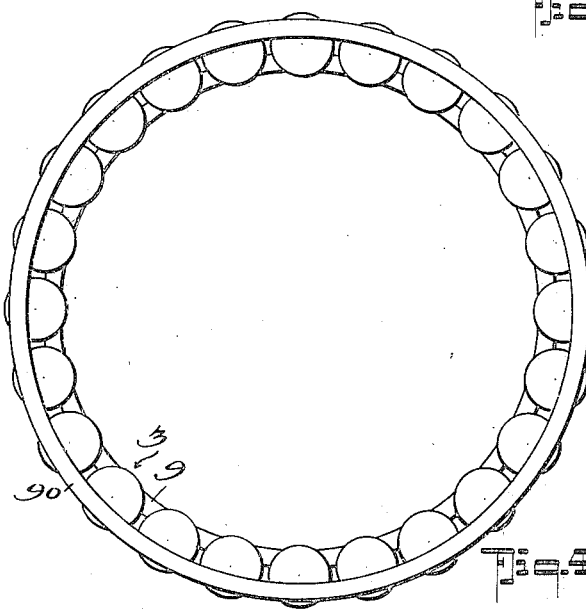
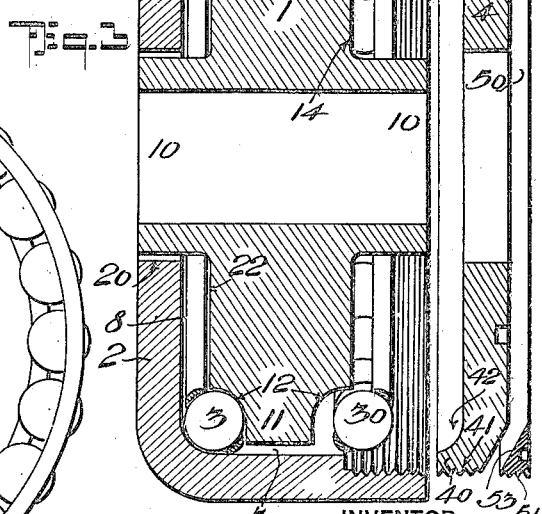
INVENTOR
Charles H. Andrus
BY Fred J. Dieterich
ATTORNEYS

UNITED STATES PATENT OFFICE.

CHARLES H. ANDRUS, OF SAN FRANCISCO, CALIFORNIA, ASSIGNOR OF FORTY PER CENT. TO MORGAN D. ANDRUS, JR., OF DE QUINCY, LOUISIANA.

BALL-BEARING.

1,363,705.  Specification of Letters Patent.  Patented Dec. 28, 1920.

Application filed May 20, 1920. Serial No. 382,905.

*To all whom it may concern:*

Be it known that I, CHARLES H. ANDRUS, a citizen of the United States, residing at San Francisco, in the county of San Francisco and State of California, have invented certain new and useful Improvements in Ball-Bearings, of which the following is a specification.

My invention has reference to ball bearings in which the coöperating parts are more especially designed to withstand thrusts, maintain loads in all types of vehicles, heavy automobiles, electric trucks, gasolene delivery wagons, and which is readily adapted as a bearing or thrust in machinery where ball bearings are needed.

Primarily, my invention has for its purpose to provide an improved bearing means of the general character stated, simple and inexpensive, highly efficient and durable, and in which provision is made for conveniently adjusting the balls on the bearing surfaces or cones in the races as they may become worn.

Another and advantageous feature of my invention is embodied in a simple construction of the cup and the adjusting plate in which the ball races are formed, whereby to provide for easily and effectively refacing the worn bearing surfaces and reassembling the parts after the surfaces have been refaced, whereby the bearing is rendered as good as a new one.

In its more complete nature, my invention comprehends a ball bearing of the character described in which is included a peculiar arrangement of ball retaining means, a structural arrangement of the bearing surfaces in the cone member, the relation of the cup and the adjusting plate and its cone bearings, whereby the operation of fitting the annular sets of bearing balls in proper place, when assembling the parts, is rendered convenient and the said retaining members, at all times, held in a position out of the way of engagement with the cone, the cup or the adjusting plate and in such manner that on the removal of the adjusting plate and the cup from connection with the central or cone member, the annular sets of balls and their retaining means can be easily removed and as readily replaced, after dressing the bearing surfaces for taking up wear and for the proper adjustments of the balls.

With the above objects in view, my invention comprises an improved ball bearing structure that embodies the peculiar arrangement and combination of parts set out in detail in the following description, as specifically stated in the appended claim and as illustrated in the accompanying drawings, in which:

Figure 1 is a vertical section of an adjustable ball bearing constructed in accordance with my invention, the parts being at their assembled or operative position.

Fig. 2 is a face view thereof, looking in the direction of the arrow $a$.

Fig. 3 is a sectional view that illustrates the manner of fitting the cup or shell member and its engaging race of bearing balls over and into engagement with the cone or body portion of the bearing.

Fig. 4 is a face view of one of the annular sets of bearing balls and the two retainer and spacer rings combined therewith.

Fig. 5 is an edge view of the parts shown in Fig. 4.

In the practical development of my invention, the body or cone portion includes a sleeve member 1 formed with oppositely projected hubs 10—10 and an annular cone or bearing member 11, the latter provided at the opposite peripheral edges with annular ball races or seats 12 with which the inner and outer series of a double row of ball bearings engage in the manner clearly shown in the drawings and presently more fully explained.

2 designates a cup-shaped casing or shell, the base of which has an axial aperture 20 for loosely fitting over one of the hub extensions 10 of the member 1.

The cup-shaped shell 2 is of such depth that its annular rim, when the casing is applied (as in Fig. 1) extends across the full length of the sleeve portion of the said member 1 and at the bend of the said shell, its inner annular rim face is shaped to constitute a concaved bearing race for the inner set 3 of a double row of bearing balls 3 and 30.

The rim 2 of the shell or casing is formed at its outer or open end with an internally threaded annular socket 21, the base of which is approximately in transverse alinement with the innermost face 14 of the annular or cone bearing 11, as is clearly shown in Fig. 1, by reference to which it will also be observed the said inner face and the outer or opposing face 22 of the bearing 11 at the peripheral edges thereof are each formed with a concaved ball bearing or race, hereinbefore referred to, with which the outer and inner annular set of bearing balls engage, as shown.

Coöperative with the inner ball race 12 formed on the bearing 11 and the socketed threaded portion 21 of the casing is a combined bearing and adjusting plate 4 which has an annular inwardly extending flange 40 that is externally threaded at 41 for engaging the threaded socket 21 and the said flange has its inner annular portion fitted to form a ball race 42 for bearing against the outermost set of bearing balls 30.

It will be observed by referring to Fig. 1, that the two sets of bearing balls are so held that their inner edges contact with the ball races on the bearing surfaces at the opposite edges of the periphery of the bearing 11 and that the outer faces of the outer row of balls engage the ball bearing formed in the inner annular edge of the casing rim 2, while the other row of balls have their outer contacting surfaces in engagement with the race or ball bearing 42 on the adjacent plate 4, it being also apparent from Fig. 1 that the inner and outer bearing or contacting surfaces of the bearing balls are diagonally disposed with respect to the shell 2, bearing 11 and plate 4, such arrangement providing an annular space 7 between the peripheral edge of the bearing member 11 and the casing rim 20 and a chamber or space 8 and 80 between each of the opposite side faces of the bearing 11, the adjusting plate 4 at one side and the base of the cup-shaped casing 2 at the other side, the reason for which and the advantages of such arrangement of parts will be presently further explained.

For conveniently fitting the two rows of balls in their proper operative or assembled position, two retaining rings 9 and 90 are provided for each row of balls and the said rings are of different diameters, the smaller one 9 being of such size whereby it is adapted, when applied against the row of balls, to engage with the lower outer surface of the said row of balls, while the other or larger ring 90 is adapted for engaging the upper and inner face of the said row of balls, the opposing points of contact of the two rings with their respectively engaged balls being diagonally disposed with reference to the said balls and in a direction at right angles to the diagonal positions or points of contact between the said balls and their respectively engaged races in the bearing and the shell or casing.

By forming the ball retaining means of two rings of different diameters and the smaller ring adapted for engaging with the internal sides or faces of the balls and the larger diameter ring adapted for engaging the outer and upper faces of the ball, as stated and shown, provides for conveniently applying the assembled annular set of balls onto the outside race or bearing of the cone member 11 before the cup is fitted in place and for assembling the other row of bearing balls onto the opposite or inner ball race on the bearing 11 before applying the bearing plate 4, which is placed in position in the manner indicated in Fig. 3.

By arranging the two rings that constitute a set of ball retainers, as stated, and having the separations or intervening spaces between the base of the cup and the adjacent face of the bearing 11, the cup rim and the periphery of the cone bearing and the combined bearing and adjusting plate and its adjacent face of the bearing 11 provides for keeping the retainer ring within the said intervening spaces in such manner that at no time do the bearing or contacting faces of the balls and the races engage with the retainer rings, the latter being, as it were, held free from frictional wear either with the balls or their coöperating bearing faces.

For conveniently securing the combined bearing and adjusting plate to its adjusted positions and provide for a quick readjustment of the said plate, a locking ring 50 is provided that has an externally threaded rim 51 for engaging the threaded socket 21 in the cup rim and is formed with an inner beveled or tapered face for engaging the beveled seat 53 on the outer peripheral edge of the adjusting plate, as shown in Fig. 1, which also shows the adjusting plate provided with sockets 45 for receiving a spanner or other turning implement, it being understood, in practice the ring 50 may also have external means for turning it onto and out of operative connection with the cup rim.

What I claim is:

In a bearing of the kind described, the combination with a hub having an annular radially extended bearing formed with a ball race in each of its opposite peripheral edges, the said races being diagonally disposed with respect to the body of the bearing, a centrally apertured ball cup adapted for loosely fitting over one end of the hub, the said cup having an internal edge ball race that opposes the adjacent ball race on the hub bearing, the apertured or body portion of the cup being spaced from the adjacent face of the said hub bearing and having its rim portion of a width equal the length of the hub and spaced from the periphery of the hub extension, an adjusting member axially apertured to loosely fit onto the other or adjacent end of the hub, the said member including a peripheral rim having an internal ball race disposed diagonally to and opposing the ball race on the adjacent end of the hub extension, the said adjusting member being spaced apart from the adjacent face of the hub extension, means for adjustably and interlockably engaging the said member and the cup rim, bearing balls engaging each pair of opposing ball races and a retainer means for each set of bearing balls, each of the said retainer means consisting of an inner and an outer ring, the said rings being diagonally disposed relatively to the opposing bearing faces of the balls, when the parts are at the assembled position, whereby the outer ones of the sets of rings are freely sustained within the space between the cup rim and the periphery of the hub extension and the smaller rings are likewise sustained between the opposing faces of the hub extension, the cup at one side, and the adjusting member at the other side.

CHARLES H. ANDRUS.